US008556284B2

(12) United States Patent  
Appleman

(10) Patent No.: US 8,556,284 B2
(45) Date of Patent: Oct. 15, 2013

(54) SECTIONAL BICYCLE

(75) Inventor: Harry Appleman, Pewaukee, WI (US)

(73) Assignee: A-Enterprises, Inc., Pewaukee, WI (US)

( * ) Notice: Subject to any disclaimer, the term of this patent is extended or adjusted under 35 U.S.C. 154(b) by 105 days.

(21) Appl. No.: 13/016,635

(22) Filed: Jan. 28, 2011

(65) Prior Publication Data

US 2011/0187077 A1    Aug. 4, 2011

Related U.S. Application Data

(60) Continuation-in-part of application No. 12/583,613, filed on Aug. 24, 2009, now abandoned, which is a division of application No. 11/699,857, filed on Jan. 30, 2007, now Pat. No. 7,578,515.

(60) Provisional application No. 60/808,368, filed on May 25, 2006.

(51) Int. Cl.
*B62K 15/00* (2006.01)
(52) U.S. Cl.
USPC ............................................ 280/278; 280/287
(58) Field of Classification Search
USPC .................... 280/278, 287; 403/110, 196, 398
See application file for complete search history.

(56) References Cited

U.S. PATENT DOCUMENTS

| 599,978 | A |  | 3/1898 | Tanner |
|---|---|---|---|---|
| 1,428,496 | A |  | 9/1922 | Roquefort-Villenueve |
| 1,584,314 | A |  | 5/1926 | Mamiya |
| 2,283,671 | A |  | 5/1942 | Finlay et al. |
| 2,777,711 | A |  | 1/1957 | Yokomaki |
| 3,015,498 | A |  | 1/1962 | Tanaka et al. |
| 3,220,748 | A |  | 11/1965 | Moulton |
| 3,294,416 | A |  | 12/1966 | Carnielli |
| 3,359,012 | A |  | 12/1967 | Westerheide |
| 3,485,510 | A | * | 12/1969 | Merlan .......................... 280/250 |
| 3,608,917 | A | * | 9/1971 | Cogliano ..................... 280/7.16 |
| 3,645,212 | A |  | 2/1972 | Dahlstrom |
| 3,791,672 | A | * | 2/1974 | Pera .............................. 280/287 |
| 3,807,762 | A |  | 4/1974 | Ogisu |
| 3,814,462 | A |  | 6/1974 | Kelly |
| 3,854,755 | A |  | 12/1974 | Tang |
| 3,865,403 | A |  | 2/1975 | Majerus |
| 3,889,974 | A |  | 6/1975 | Kallander |
| 3,979,136 | A |  | 9/1976 | Lassiere |
| 4,022,485 | A |  | 5/1977 | Cox |
| 4,182,522 | A |  | 1/1980 | Ritchie |
| 4,417,745 | A |  | 11/1983 | Shomo |
| 4,421,337 | A |  | 12/1983 | Pratt |
| 4,440,414 | A |  | 4/1984 | Wang |

(Continued)

FOREIGN PATENT DOCUMENTS

BE       628783      6/1983
DE       147126      12/1903

(Continued)

*Primary Examiner* — Anne Marie Boehler
*Assistant Examiner* — Maurice Williams
(74) *Attorney, Agent, or Firm* — Ryan Krumholz & Manion, S.C.

(57) ABSTRACT

A modular bicycle comprising a first section having a front frame section and a first tire, a second section being couplable to the first section and comprising a central frame, and a third section being couplable to the second section and the first section, with the third section comprising a rear frame section, a second tire, and a handle bar.

4 Claims, 16 Drawing Sheets

(56) References Cited

U.S. PATENT DOCUMENTS

| | | | |
|---|---|---|---|
| 4,441,729 A | 4/1984 | Underwood | |
| 4,582,335 A | 4/1986 | Paioli et al. | |
| 4,611,945 A | 9/1986 | Diego | |
| 4,824,131 A | 4/1989 | Thay | |
| 5,125,678 A | 6/1992 | Bogen | |
| 5,337,609 A * | 8/1994 | Hsu | 74/551.3 |
| 5,558,349 A | 9/1996 | Rubin | |
| 5,716,065 A | 2/1998 | Liu | |
| 5,887,882 A | 3/1999 | Atchison | |
| 6,032,971 A | 3/2000 | Herder | |
| 6,135,478 A | 10/2000 | Montague | |
| 6,286,848 B1 | 9/2001 | Augustin | |
| 6,581,492 B1 | 6/2003 | Chen | |
| 6,612,597 B2 | 9/2003 | Baker et al. | |
| 6,929,277 B2 | 8/2005 | Chao | |
| 2003/0080531 A1 | 5/2003 | Ritchey | |
| 2008/0088113 A1 * | 4/2008 | Menayan | 280/287 |

FOREIGN PATENT DOCUMENTS

| | | |
|---|---|---|
| DE | 309357 | 6/1917 |
| DE | 504805 | 8/1930 |
| DE | 808190 | 7/1951 |
| DE | 812156 | 8/1951 |
| DE | 822347 | 11/1951 |
| DE | 1084159 | 6/1960 |
| DE | 1905388 | 7/1964 |
| DE | 1810445 | 7/1969 |
| DE | 3230624 | 2/1984 |
| DE | 3701803 | 1/1987 |
| FR | 1443948 | 5/1966 |
| FR | 867505 | 1/1987 |
| GB | 415843 | 11/1941 |
| GB | 548348 | 10/1942 |
| GB | 578384 | 6/1946 |
| GB | 604113 | 6/1948 |
| GB | 1267647 | 3/1972 |
| GB | 2171656 | 9/1986 |
| SU | 472054 | 9/1975 |

\* cited by examiner

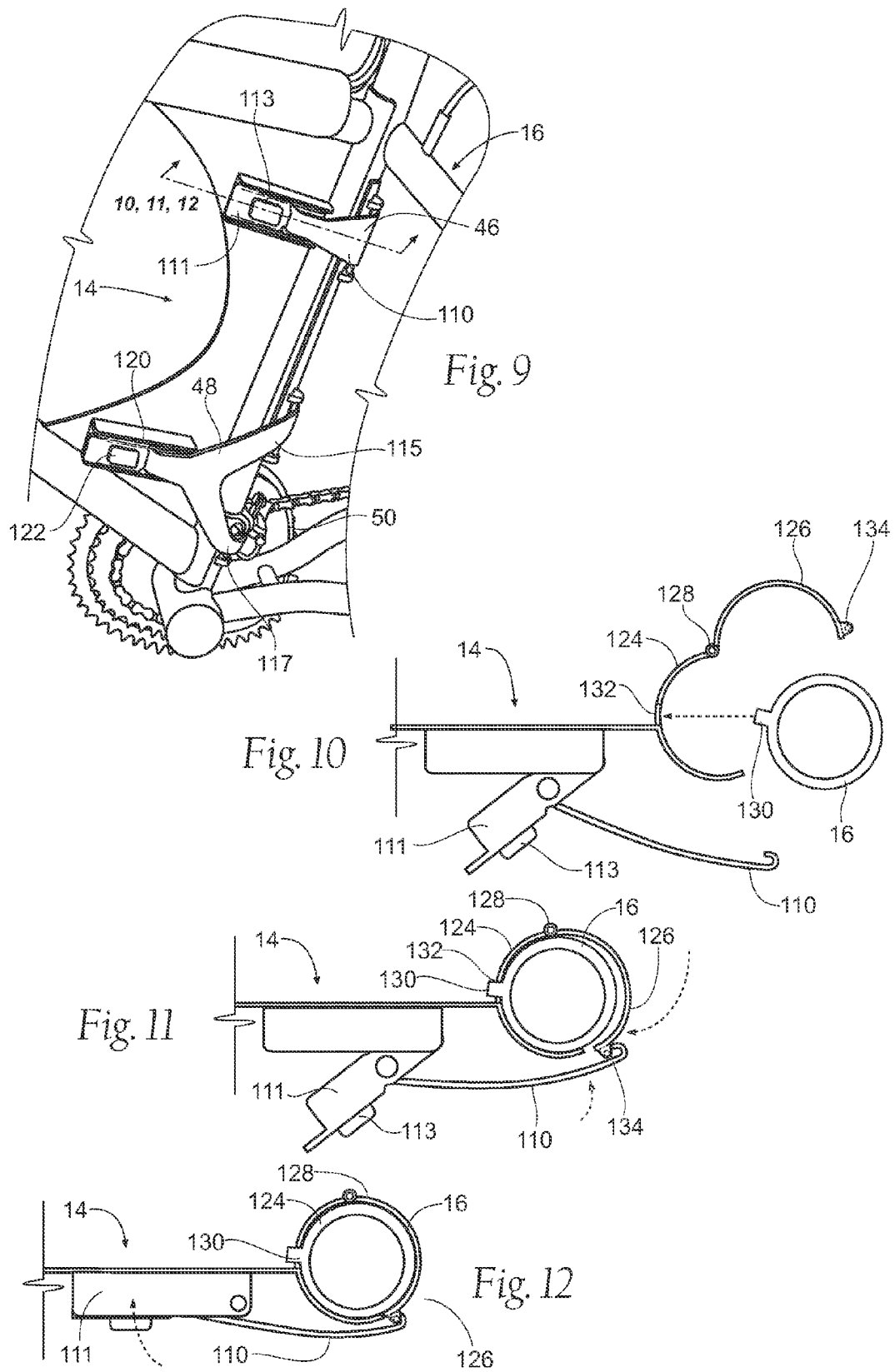

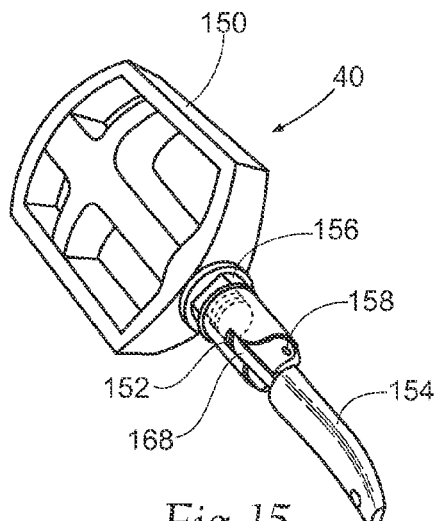
Fig. 15
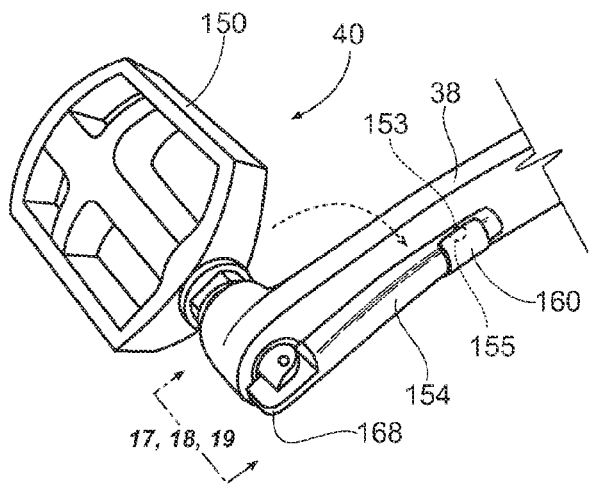
Fig. 16
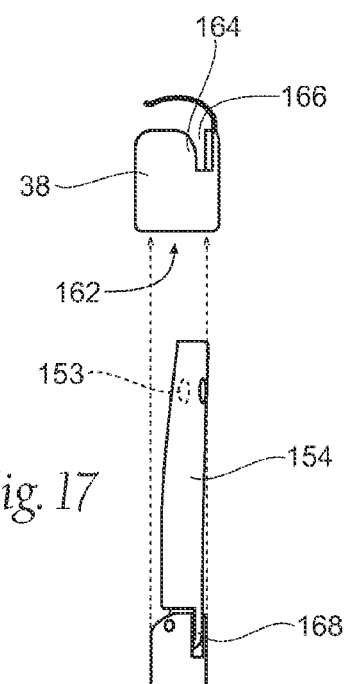
Fig. 17
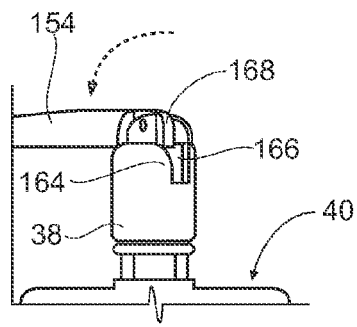
Fig. 18
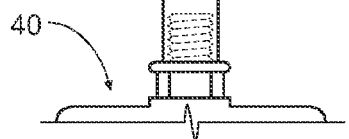
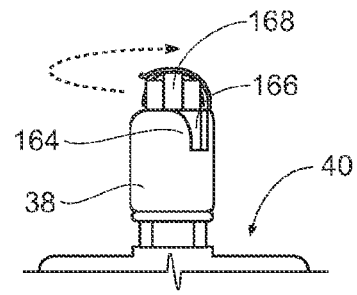
Fig. 19

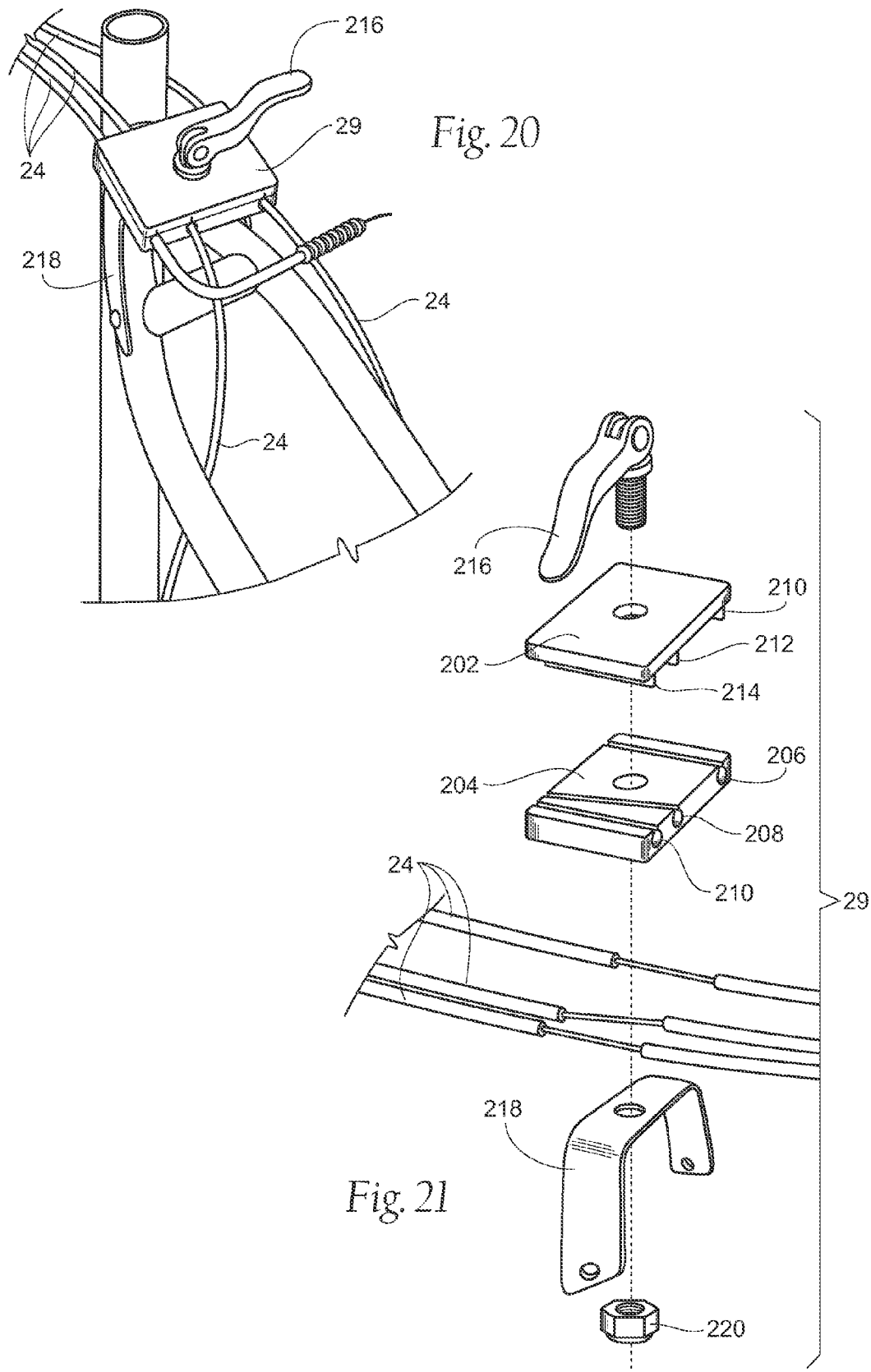

SECTIONAL BICYCLE

RELATED APPLICATION

This application is a continuation-in-part of U.S. patent application Ser. No. 12/583,613, filed 24 Aug. 2009, which is a divisional of application Ser. No. 11/699,857, filed 30 Jan. 2007, now U.S. Pat. No. 7,578,515, which claims the benefit of U.S. Provisional Patent Application Ser. No. 60/808,368, filed 25 May 2006.

BACKGROUND OF THE INVENTION

The present relates to bicycles and, more specifically, to bicycles that can be collapsed for storage purposes.

In today's urban settings, fewer and fewer areas are accessible for one to ride a bicycle, especially in a recreational sense. Consequently, cyclists are more frequently transporting bicycles to distant areas where they may be able to ride their bikes. To accommodate such trips, bicycle makers have developed bikes that can be reduced in size for easier transportation. Common ways of reducing sizes have been to have removable front tires on the bicycles and to have frame designs that allow the front and rear tires to be folded inwardly with respect to the frame. Examples of such folding or collapsing bikes may be seen in Bogen, U.S. Pat. No. 5,125,678 and Hellestam et al., U.S. Pat. No. 4,895,386. While these bicycles have somewhat reduced the space required for storing a bicycle during transport, they still take up greater amounts of space than desired.

Other bicycle designs have been designed so that the bicycle could be broken down into several pieces or sections. Examples of such bicycles are shown in Geisel, U.S. Pat. No. 3,876,231, Underwood, U.S. Pat. No. 4,441,729, and Chao, U.S. Pat. No. 6,929,277. While these bicycles may be broken down into several sections, they are not the easiest to reassemble, and have several small parts that must be organized when storing the bicycle. Such arrangements could be difficult to assemble in a rough terrain, such as a park or other wildlife area. Likewise, these bikes cannot be assembled in a short period of time, such as a few minutes. Furthermore, such designs do not take into account bicycles that have multiple gears, such as ten or fifteen speed bicycles.

Thus, it is desirous to design a sectional bike of any gear arrangement that could be easily disassembled and reassembled and transported.

SUMMARY OF THE INVENTION

The present invention provides a bicycle that can be disassembled into a few sections that are completely separable. Generally, the bicycle comprises a front section comprising the front wheel and the front brake, a central frame section, and a rear section comprising the rear wheel, chain assembly, and the handle bars. The bike is easily disassembled and reassembled quickly and efficiently, and is sturdy enough for such rugged activities as mountain biking and the like. The connections for each section are uniquely designed, as well. The bicycle is designed for any type of bicycles, from single gear bicycles to multiple gear bicycles. The bicycle provides a locking mechanism for various cables that run from the controls and levers located on the handle bars to the brakes and derailleurs of the bicycle. The locking mechanism allows for the proper tension to be kept on the various components during assembly and disassembly of the bicycle.

The pedals attached to the bike also have a unique arrangement that allows them to be easily attached and reattached from the bicycle. The pedals do not have the problems that prior art devices may encounter, such as problems associated with slippage or improper folding of the pedals when the bicycle is in use.

The attachment of the handle bars to the frame also provides a unique arrangement, which provides for easy interaction and attachment.

These and other novel features of the present invention will become evident with regard to the drawings and the specification.

BRIEF DESCRIPTION OF THE DRAWINGS

FIG. 9 is a close-up, perspective view of attachment means for the frame and the rear section of the present invention.

FIG. 10 is an overhead view of the attachment means of FIG. 9 in an open position taken along line 10-10 of FIG. 9.

FIG. 11 is an overhead view of the attachment means of FIG. 9 in a second open position taken along line 11-11 of FIG. 9.

FIG. 12 is an overhead view of the attachment means of FIG. 9 in a closed position taken along line 12-12 of FIG. 9.

FIG. 15 is a perspective view of a pedal used in the present invention.

FIG. 16 is a perspective view of the pedal of FIG. 15 attached to a crank arm.

FIG. 17 is an exploded, sectional view of the pedal of FIG. 16 taken along line 17-17 of FIG. 16.

FIG. 18 is a perspective view of the pedal of FIG. 16 in a first position taken along line 18-18 of FIG. 16.

FIG. 19 is a perspective view of the pedal of FIG. 16 in a second position taken along line 19-19 of FIG. 16.

FIG. 20 is a partial perspective view of a bicycle frame and a cable securing device used in accordance with the present invention.

FIG. 21 is an exploded view of the cable securing device shown in FIG. 20.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
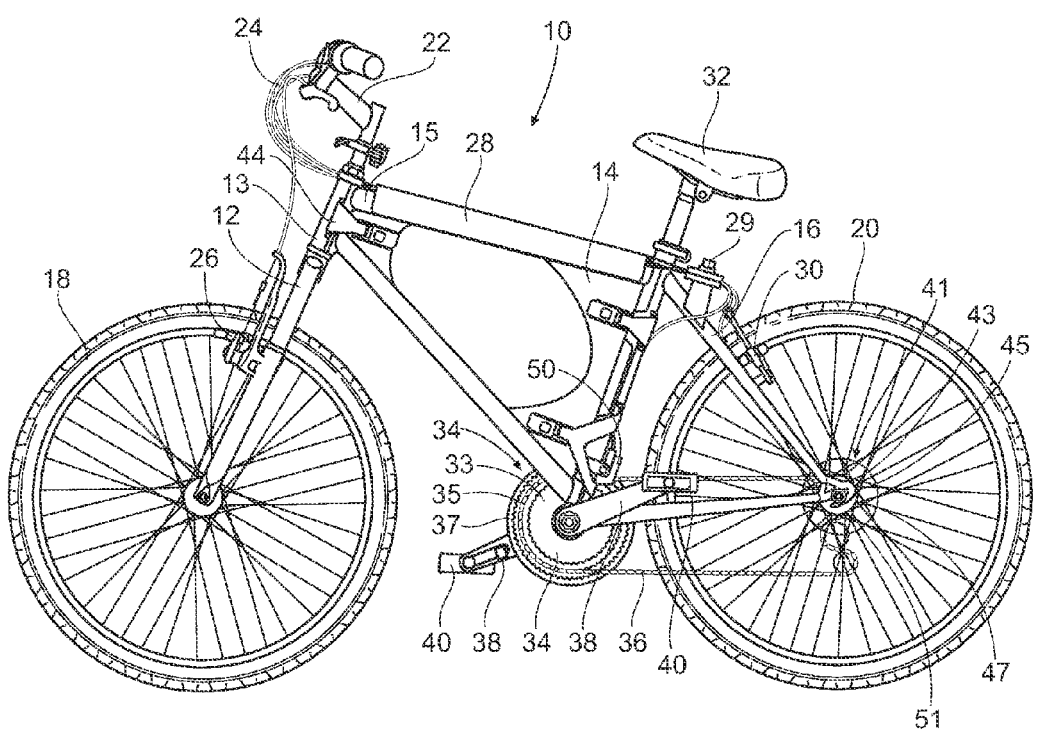
FIG. 1 is a perspective view of a bicycle according to the present invention.

FIG. 1 depicts a bicycle 10 according to the present invention. As will be shown, the bicycle 10 provides a sturdy construction that allows the bicycle to be used normally in all types of terrain, while being able to be collapsed quickly and easily for storage and transportation. The bicycle 10 generally comprises a first or front section 12 comprising a front frame section 13, a second section 15 comprising a central frame 14, and a rear or third section 16. The front section 12 supports a first or front tire 18, and the rear section 16 supports a tire 20. The front section 12 also supports handle bars 22, which supports a variety of cables 24 attached to various components, such as a front brake 26, a rear brake 30, a front derailleur 49, a rear derailleur 51 and a cable guide 50. The cable guide 50 is not necessary for all arrangements of the gears and cables. The cables 24 that travel to the various items located on the rear section 16 are secured to the frame 14 by way of a cable holder 28 and a cable securing device 29. The rear section 16 further supports a chain assembly 31 which comprise a front or crank sprocket assembly 34, a chain 36 and a rear or drive sprocket assembly 41. The crank sprocket assembly 34 further comprises a plurality of individual crank sprockets 33, 35, and 37 and the drive sprocket assembly 41 comprises a plurality of individual drive sprockets 43, 45, and 47. It is understood that the bicycle could have more or fewer crank and drive sprockets and still fall within the scope of the present invention.

Still referring to FIG. 1, the rear section further supports a pair of crank arms 38, and a pair of pedals 40. The bicycle 10 shown in FIG. 1 is exemplary of several different arrangements that the present invention will fall within. The following figures will give further details and description of the various novel features of the present invention.

Figure 2:
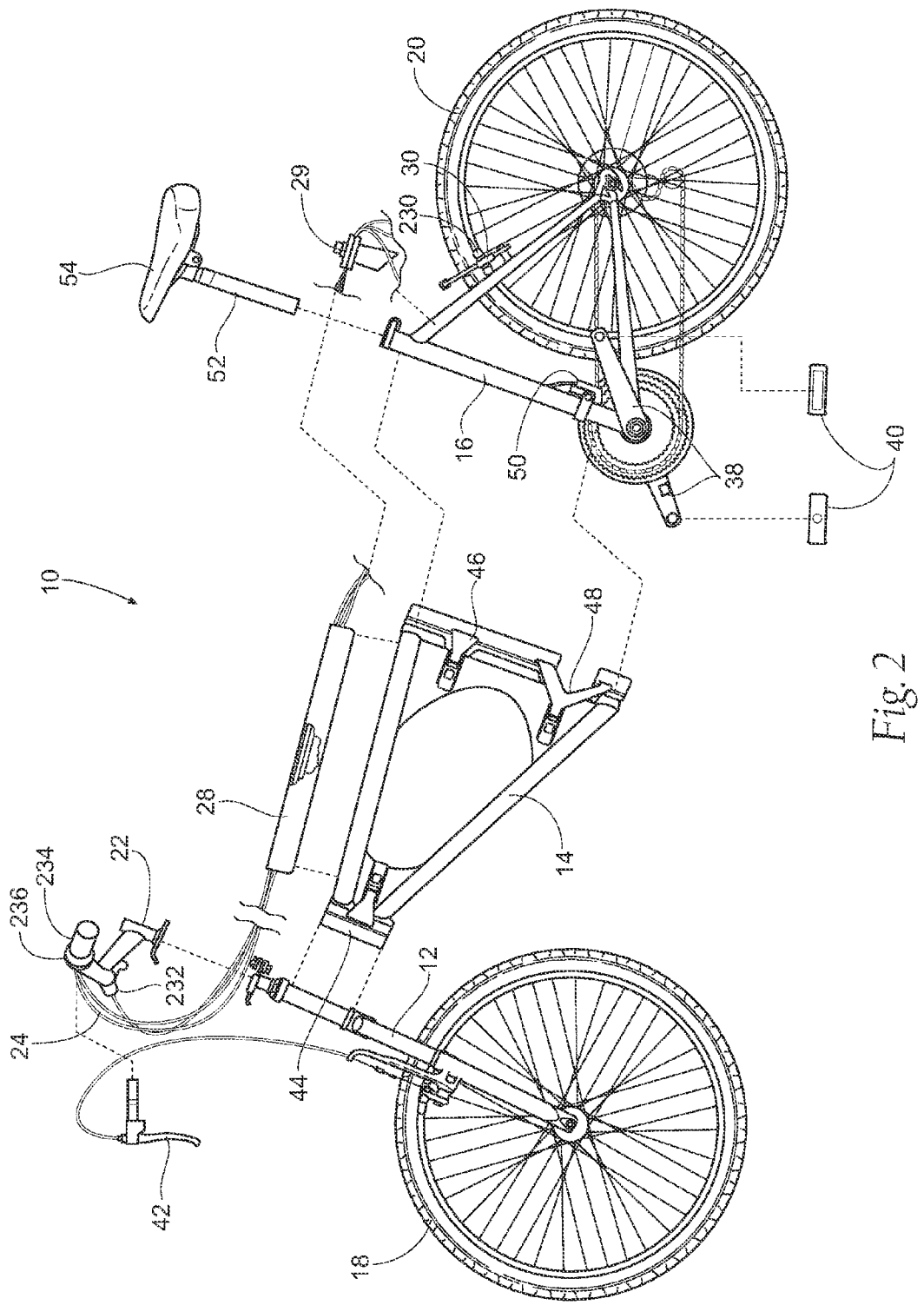
FIG. 2 is an exploded view of the bicycle of FIG. 1.

FIG. 2 provides an exploded view of the bicycle 10. The front section 12, the frame 14, and the rear section 16 are separable from one another. The handlebars 22 are detachable from the front section 12, with the handlebars 22 and the cables 24, passing through the securing device 29 and leading to the rear brake 30 and the derailleurs 49 and 51, being kept attached to the rear section 16. The cables 24 are kept from being mixed-up or tangled by way of the cable holder 28, and the securing device 29 allows the cables 24 to be properly tensioned even when the bicycle is disassembled. A front brake handle 42 is kept attached to the front brake 26 and the front section 12. The frame 14 is attached to the front section 12 by way of a first clamp 44. The frame 14 is attached to the rear section by way of a pair of clamps 46, 48. The clamps will be discussed in more detail with respect to FIGS. 7-12. It is understood that more or fewer clamps may be used for attaching the various sections of the bicycle 10 and still fall within the scope of the present invention.

Still referring to FIG. 2, the rear section 16 supports a post 52 and a seat 54, which are removable from the rear section 16. As previously stated, the rear section 16 supports the crank arms 38, which in turn support the pedals 40. The pedals 40 are removable from the crank arms 38 and will be described in further detail with respect to FIGS. 16-19. The rear brake 30 comprises brake pads that form a brake pad mechanism 230, which are connected to a brake lever 232 located on the handle bars 22 by way of one of the cables 24. The handle bars 22 also support gear shifters 232 and 234 that are connected to a respective derailleur 49 and 51 by way of a respective cable 24.

As FIG. 2 shows, the various sections of the bicycle 10 are separable from one another. However, in comparison with previous sectional or separable bicycles, the present invention allows for easy assembly and disassembly. It is possible to assemble the bicycle in a few minutes, possibly in less than two minutes. As will be discussed further, the ease of attaching the front section 12 and rear section 16 to the frame 16 with the clamps 44, 46, 48 makes the present invention an improvement over the prior art.

Figure 3:
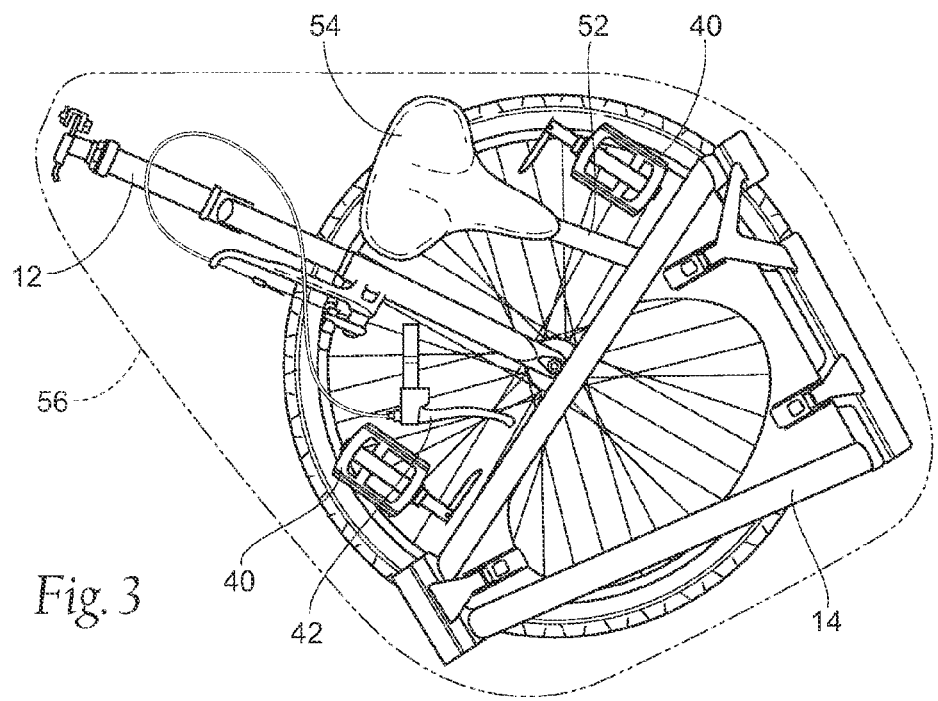
FIG. 3 is an overhead view of a collapsed front section and frame of the bicycle of FIG. 1 within a storage bag.
Figure 4:
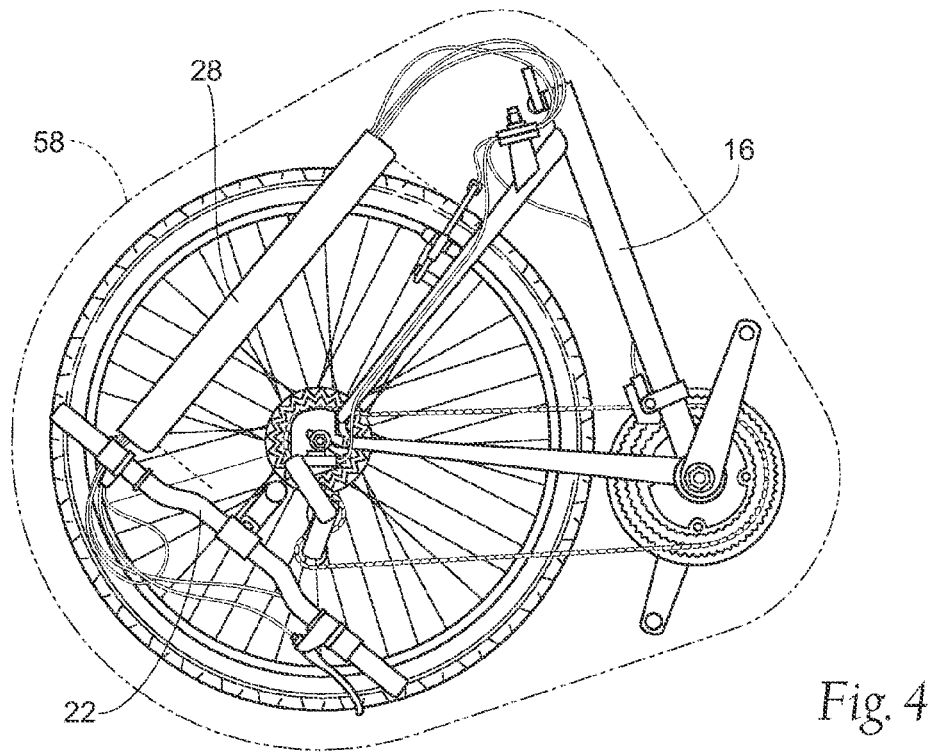
FIG. 4 is an overhead view of a collapsed rear section of the bicycle of FIG. 1 within a storage bag.

FIGS. 3 and 4 show the bicycle stored away in a pair of bags 56 and 58 for storage and transportation. In FIG. 3, the bag 56 houses the front section 12, including the front brake handle 42, the frame 14, the seat 54 and the post 52, and the pedals 40. The seat 54 preferably folds inwardly towards the post 52 to further minimize the area required for storage, while minimizing time needed to refasten or rejoin different parts of the bicycle. In FIG. 4, the bag 58 houses the rear section 16, the handle bars 22 and the cable holder 28. The arrangement of the specific parts in the bags 56, 58 is designed to minimize the area required for storage of the bicycle. However, it is understood that other arrangements are possible.

Figure 5:
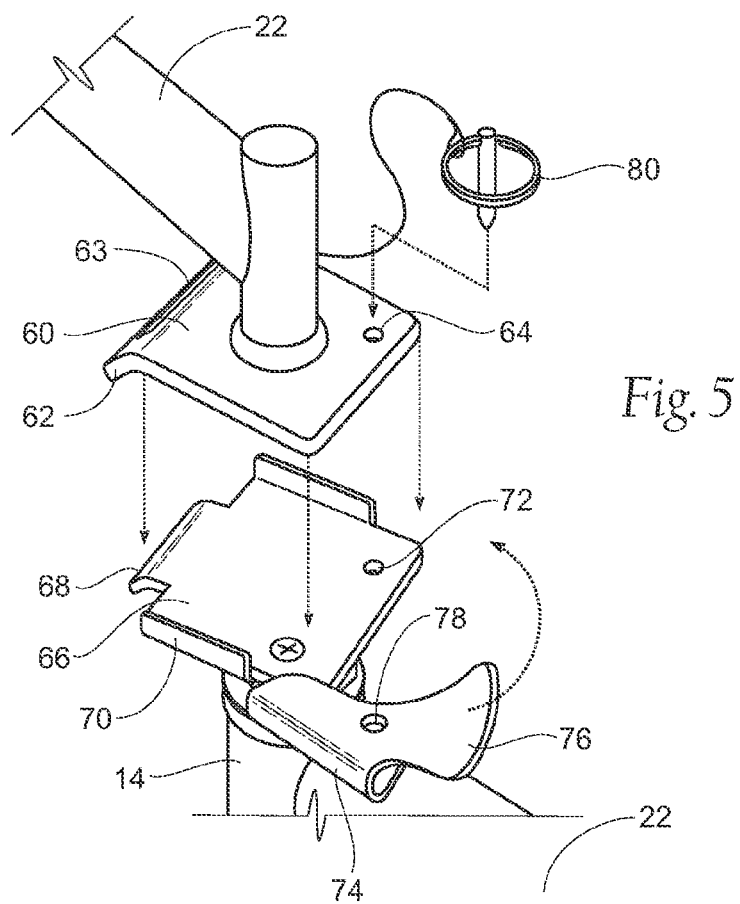
FIG. 5 is a close-up, exploded, perspective view of a handle bar attachment according to the present invention.
Figure 6:
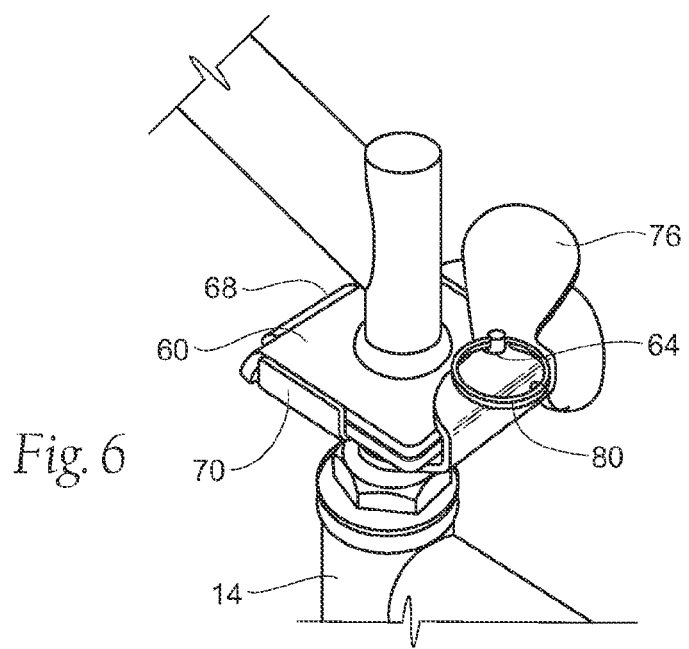
FIG. 6 is a close-up, perspective view of the handle bar attachment of FIG. 5.

FIGS. 5 and 6 provide close-up views of the handle bars 22 and the front section 12 (see FIGS. 1 and 2). The handle bars 22 and the front section 12 are mated together with a unique, quick-release structure. The handle bars 22 are supported by a base plate 60 which further comprises an angled lip 62. A slot 63 is located within the angled lip 62. A hole 64 is located in the base plate 60. The front section 12 supports a support plate 66 having a support lip 68 and a pair of upstanding walls 70. A hole 72 is also located on the support plate 66. The arrangement of the locking or latching assembly between the handle bars 22 and the front section is designed so that the individual sections easily mate with one another. That is, the base plate 60 and the support plate 66 are designed to be seated firmly together, while the support lip 68 is designed to be inserted into the slot 63. The upstanding walls 70 further insures the base plate 60 and the support plate 66 are properly aligned, and the wall provides further supporting structure for the device. While it is preferred that a pair of upstanding walls 70 are used for sufficient alignment of the base plate 60 and the support place 66, it is understood that one wall 70 could be used and still fall within the scope of the invention.

Still referring to FIGS. 5 and 6, a clamping section 74 is pivotally connected to the support plate 66. The clamping section 74 further comprises a flange 76 and a hole 78. The flange 76 is flared so that it is easy for the user to move the flange 76 and the clamping section 74 towards the position in FIG. 6. The hole 78 on the clamping section 74 aligns with the holes 64 and 72 when moved to the closed or clamp position shown in FIG. 6. A pin 80 will be inserted through the holes 64, 72, and 80 to secure the handle bars 22 to the front section, thereby providing a secure, easy to assemble arrangement. As will be understood, any similar locking or securing means similar to the pin may be used in the present invention and still fall within the scope of the present invention. The arrangement of the intersection of the slot 63 and the support lip 68, together with the clamping section 74, provides a durable structure that is easy to assemble, which was not known previously in the prior art.

Figure 7:
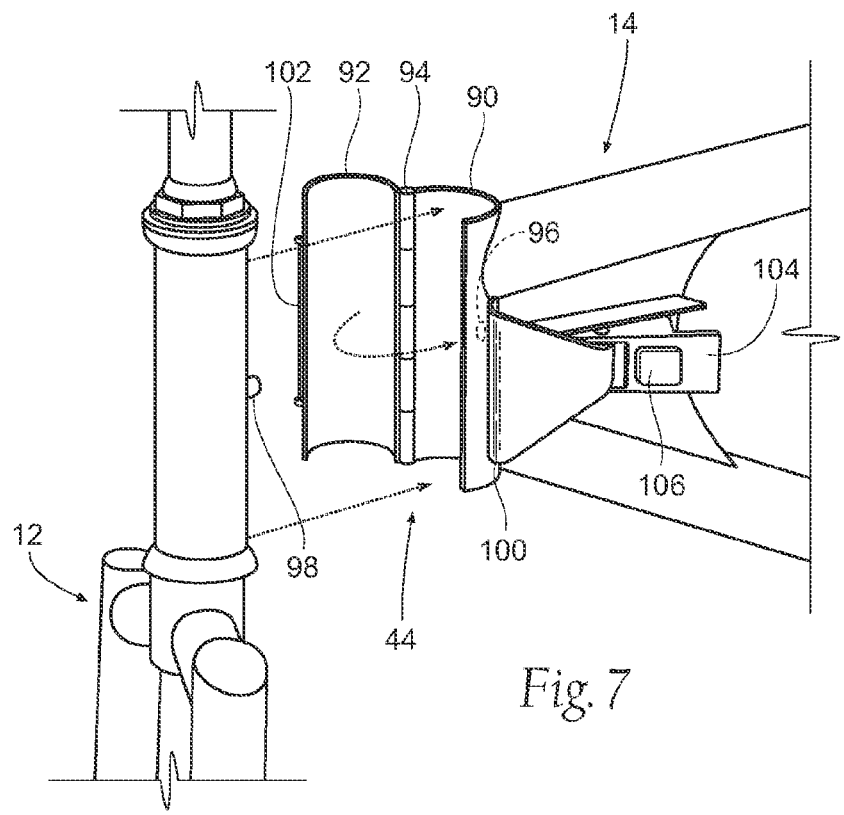
FIG. 7 is a close-up, exploded, perspective view of attachment means for the frame and the front section of the present invention.
Figure 8:
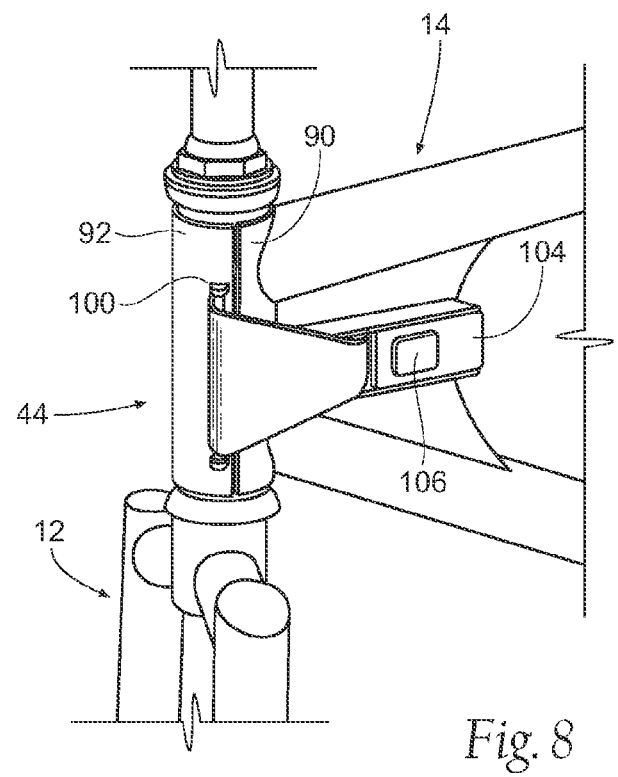
FIG. 8 is a close-up, perspective view of the attachment means of FIG. 7.

Referring to FIGS. 7 and 8, the front section 12 is shown being attached to the frame 14. As previously stated, the clamp 44 is used to secure the two sections together. The clamp 44 generally comprises a first section 90 integrally formed with the frame 14, and a second section 92 that is pivotally connected to the first section 90 by ways of a hinge 94. The first section 90 further comprises a hole 96 that is aligned with a stud 98 located on the front section 12 when the clamp 44 surrounds the front section 12. The size and length of the stud 98 may be of any suitable dimensions, and preferably is of a sufficient dimension so that when the stud 98 is inserted into the hole 96, there is excess length so that a pin or similar item (not shown) may be inserted into the stud 98 for extra security purposes.

Still referring to FIGS. 7 and 8, the first section 90 further comprises a clasp 100 that interacts with an overhang 102 when the clamp 44 is positioned around the front section 12. The clasp 100 and the overhang 102 will then be pulled together tightly with a locking section 104, which provides sufficient tension to couple the clasp 100 and the overhang tightly together. A release 106 may be located on the locking section 104 for disassembly. The arrangement provides a solidly secured bicycle by using simple and easy to assemble parts.

FIGS. 9-12 further depict the interaction and securing of the frame 14 to the rear section 16. As previously noted, the clamps 46 and 48 secure the frame to the rear section 16, similarly as described with the clamp 44 securing the front section 12 to the frame 14. Similarly to the clamp 44, the clamp 46 has a clasp 110 connected to a locking section 111. The locking section also has a release 113 that allows the clamp 44 to be released, if necessary. The clamp 48 works similarly to the clamps 44 and 46, but is preferably comprised of a pair of clasps 115, 117 instead of a single clasp. The pair of clasps 115, 117 allows the frame 14 to be secured to the rear section 16 without interfering with the cable guide 50 and the cables connected thereto. The clamp 48 also has a locking section 120 with a release 122.

Referring further to FIGS. 10-12, the interaction between the clamp 46 and the rear section 16 is shown in detail. The clamp 46 has a first section 124 that is integrally connected to the frame 14 and a second section 126 that is pivotally connected to the first section 124 by way of a hinge 128. The rear section 16 and the frame 14 will be aligned by inserting a stud 130 located on the rear section 16 into a hole 132 located on the frame 14. The stud 130 may be of any length and may be of sufficient length so that the stud may receive a possible device for locking or securing the stud 130 in place (not shown). When the clamp 46 surrounds the rear section 16, a flange 134 located on the second section 126 interacts with the clasp 110, as shown in FIG. 11. The locking section 111 is then pushed inwardly towards the frame 14, thereby securing the frame 14 and rear section 16 together in a sturdy manner.

Figure 13:
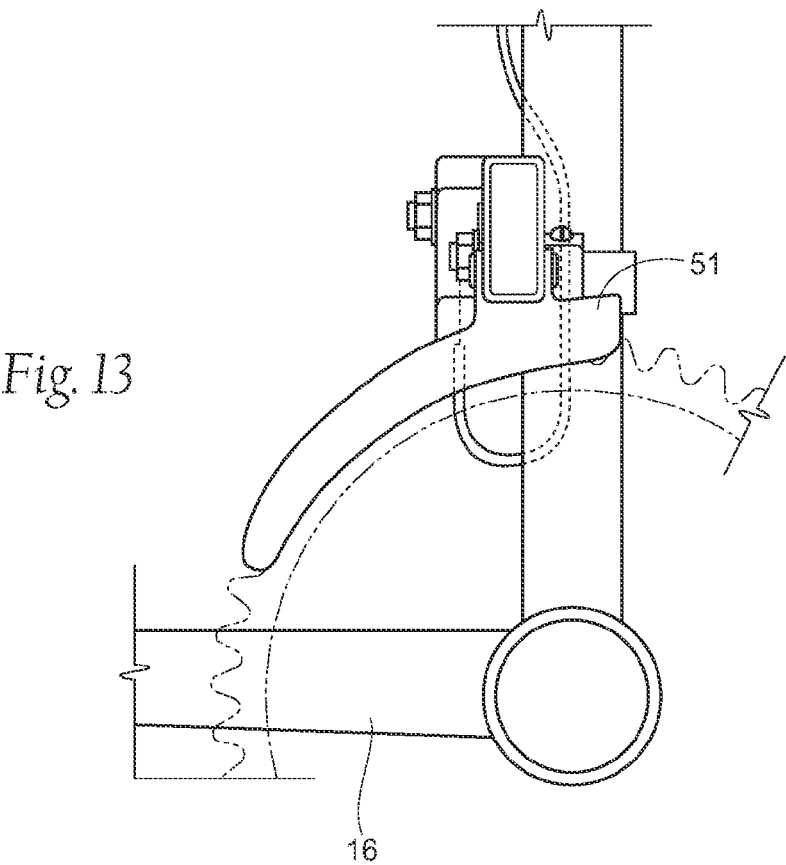
FIG. 13 is a close-up, sectional view of a derailleur used in the present invention.

FIG. 13 provides a close-up view of the front derailleur 51. As compared to FIG. 1, the cable guide 50 is not present in FIG. 13. The cable guide 50 is arranged for a bottom pull cable so that it will not interfere with the bracket 48 (see FIG. 2). While any derailleur and cable guide arrangement may be used in the present invention, the current arrangement allows for the maximum stability, without compromising the shifting functions of the bicycle. It is also possible to use an overhead pull cable arrangement, as well, as is demonstrated in FIG. 13.

Figure 14:
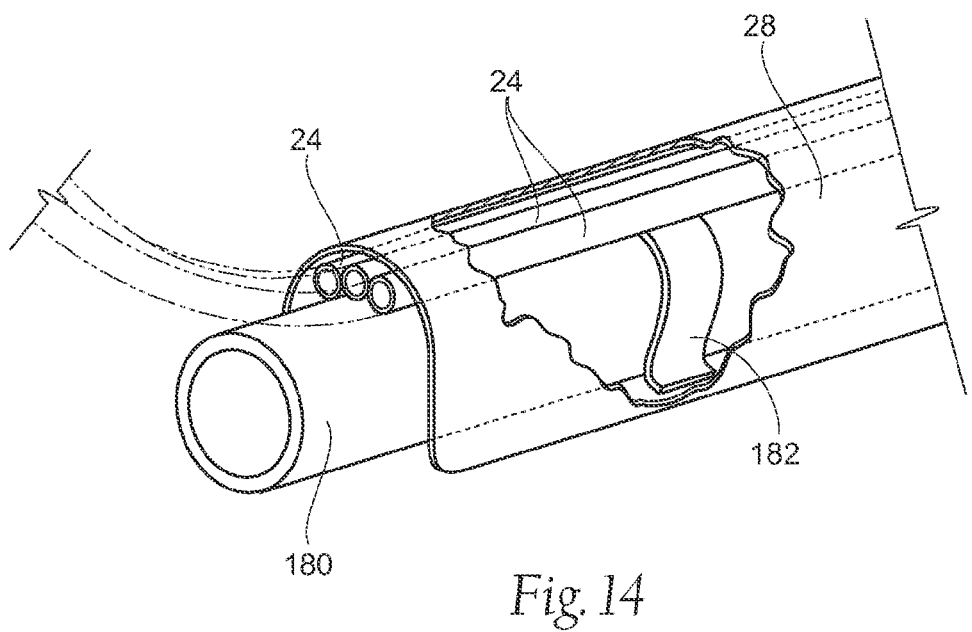
FIG. 14 is a close-up, perspective, partially cut-away view of a cable attachment assembly used in the present invention.

FIG. 14 provides a close-up, partially cut-away view of the cable holder 28. The cable holder 28 is secured to a cross bar 180 by way of a locking clip 182. The cables 24 are situated between the locking clip 182 and the upper surface of the cable holder 28, thereby preventing the cables 24 from becoming tangled. The arrangement provides easy attachment means, and further assists in the bicycle being assemble and disassembled. It should be understood that each cables 24 is connected to a specific device, such as rear brake 30, derailleurs 49 and 51, and there will be more or fewer cables 24 depending on the number of specific devices included on the bicycle 10.

FIGS. 15-19 depict the pedal 40 used in the present invention. The pedals 40 are able to be easily attached and removed from the crank arms 38 when necessary, thereby further minimizing space when storing the bicycle 10. The pedal 40 generally comprises a foot rest 150, a base member 152, and a locking member 154. The foot rest 150 is connected to the base member 152 with a threaded bolt 156, or any other typical connector as is known in the art. The bolt 156 allows secure connection means for the foot rest 150 and the base member 152. The base member 152 and the locking member 154 are pivotally connected by way of a hinge 158, which allows for movement in at least two axes. As shown in FIG. 16, the locking member 154 will prevent the pedal 40 from unwanted movement by sliding the locking member 154 under a clip 160 located on the crank arm 38. The locking member 154 also includes a detent 155 that will interact with a cavity 153 located on the crank arm 38. It is possible that either the detent 155 and the cavity 153, or the clip 160 could be used separately to secure the locking member 154 and still fall within the scope of the present invention. The pedal 40 will be further secured to the crank arm 38, as described in FIGS. 17-19. The arrangement provides for a solidly locked foot pedal 40 that does not have the disadvantage of prior art foldable pedals that can become disorientated when a person is actively pedaling a bicycle. The pedals do not require tools for attachment, and can be attached without the need for securing nuts or bolts. The pedals 40 take a minimal storage space and can be attached to the crank arms 38 quickly and easily.

FIG. 17 shows an exploded view of the pedal 40 and the crank arm 38. The crank arm 38 has a through bore 162 generally perpendicular to the length of the crank arm 38 for receiving the base member 152 and the locking member 154. The facing surfaces of the crank arm 38 and the locking member 154 generally form camming means for providing an easier securing action for the pedal. The crank arm 38 further includes a curved surface or camming surface 164 located on the through bore 162. The through bore 162 also has a slot 166 that is generally sized to receive a tab portion 168 located on the locking member 154 when the locking member 154 is inserted through the through bore 162. As shown in FIG. 18, once the locking member 154 is inserted into the through conduit 154, the locking member is turned downwardly toward the crank arm 38. Once the locking member 154 is essentially in a parallel plane with the crank arm 38, the locking member 154 is twisted inwardly towards the crank arm 38, as shown in FIG. 19. The tab portion 168 will slide up the camming surface 164, thereby tightly securing the pedal 40 to the crank arm. Once the tab portion 168 moves past the camming surface 164, the tension between the tab portion 168 and the crank arm 38 solidly holds the pedal 40 in place. The clip 160 or the detent 153 and the cavity 155 will further secure the locking member 154 in place. The result is a stable pedal 40 that can be easily removed and attached as necessary. It is understood that the dimensions of the pedal 40 and the crank arm 38 may be altered and still fall within the scope of the present invention. For example, the crank arm 38 could be modified to be slightly larger than a typical crank arm, to provide added stability for the inserted pedal 40.

FIGS. 20 and 21 depict the cable securing device 29. When the bicycle is disassembled, the cables 24 will have a tendency to become slack, which can lead to improper alignment of the brakes and the derailleur when reassembling the bicycle 10. The device 29 allows the cables 24 to be held in place when disassembling the bicycle, whereby the tension will be properly taut when reassembling the bicycle. Thus, the specific tensions between the respective cables 24 and the rear brake 30 and the derailleurs 49, 51 do not have to be adjusted when the bicycle 10 is reassembled, thereby significantly reducing reassembling time.

The cable securing device 29 generally comprises a top section 202 and a bottom section 204. A plurality of channels 206, 208, and 210 located within the bottom section 204 allow for respective cables 24 to be situated within one of the channels. The top section 202 comprises alignment fins 210, 212, 214 that correspond with one of the channels 206, 208, and 210 so that the top section 202 and the bottom section 204 are properly situated with one another. It is understood that the orientation of the channels and the fins could be inverted and the arrangement would still fall within the scope of the present invention.

Still referring to FIGS. 20 and 21, the securing device 29 comprises a lever 216 is inserted through the sections 202, 204 and through a bracket 218. A nut 220 secures the lever 216 to the securing device 29 and allows for the lever 216 to be properly tensioned with respect to the securing device 29. When the bicycle 10 is in normal operating conditions, the lever 216 will be in an open position, which will allow forward and backward movement of the cables 24 as necessary. When the bicycle is dismantled and stored, the lever 216 will be moved to a closed position, which secures the cables 24 in place, which minimizes any necessary adjustments of the gears and the brakes when reassembling the bicycle. As is understood, the securing device 29 could take any number of forms that would allow the cables to be secured or clamped in an operating position when the bicycle is dismantled or disassembled.

An alternative version of the bicycle of this invention is specifically depicted in FIGS. 22-33, inclusive. It will be observed that the original clamps 44, 46, and 48 (see FIG. 2) may also take the form of a more directly coupleable and facile clamping arrangements as disclosed in the views of FIGS. 22-28, inclusive. In this alternative embodiment, as in the case of the embodiment of FIGS. 1 and 2, the separate first section 112 and separate second section 114 are pivotally coupled together, whereas the second section 114 is directly coupled and secured to the separate third section 116.

Figure 22:
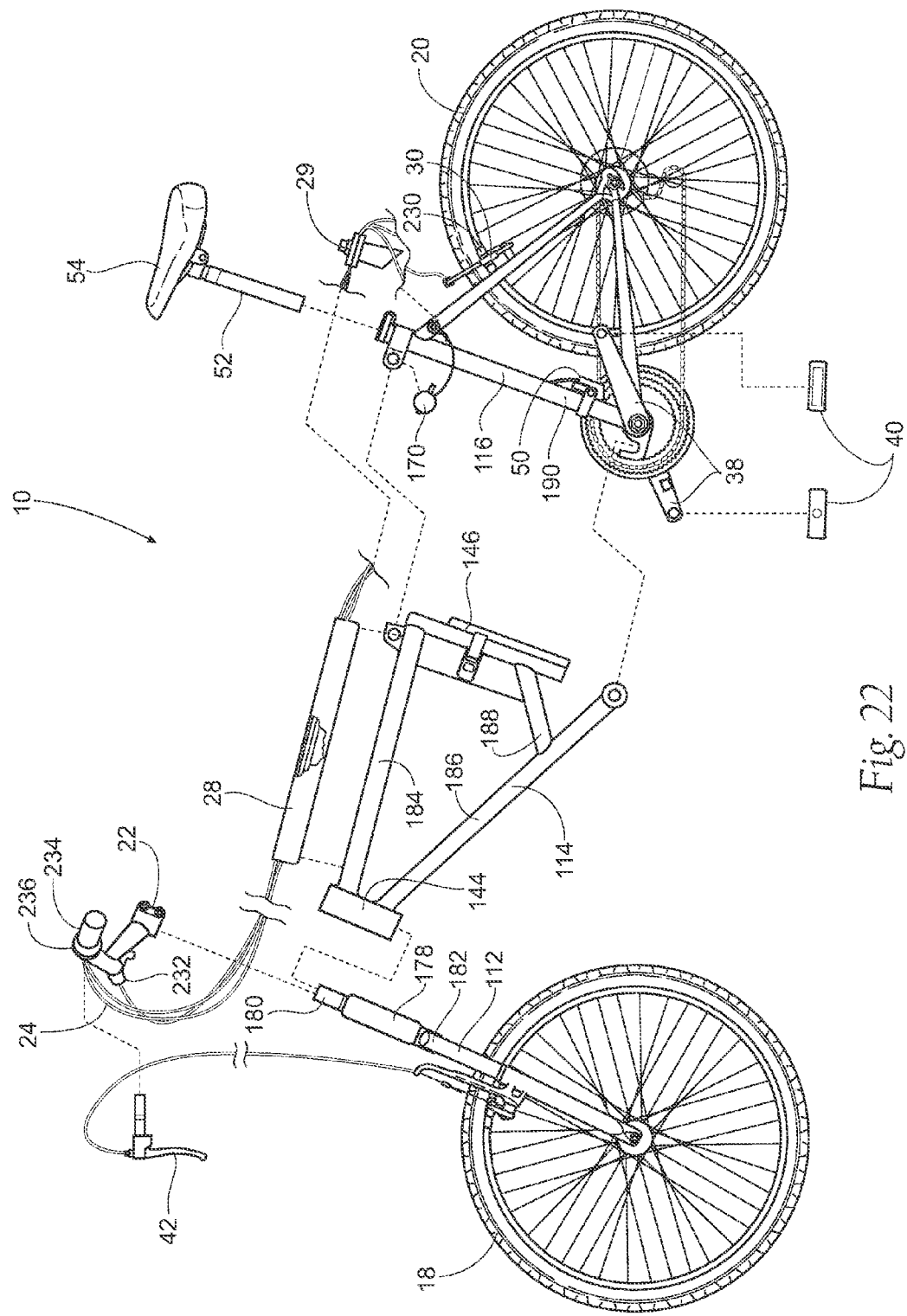
FIG. 22 is an exploded view of an alternative embodiment of a bicycle according to the present invention.

First, with reference to FIG. 22, it will be observed that the tubular clamp, or head tube 144 serves essentially the same function as the clamp 44 exhibited and described in the embodiment of FIGS. 1, 2 and 7, 8. As also illustrated in FIG. 22, a single elongated clamp 146 is substituted for the pair of spaced-apart clamps 46 and 48 illustrated in the embodiments of FIGS. 2 and 9.

Figure 23:
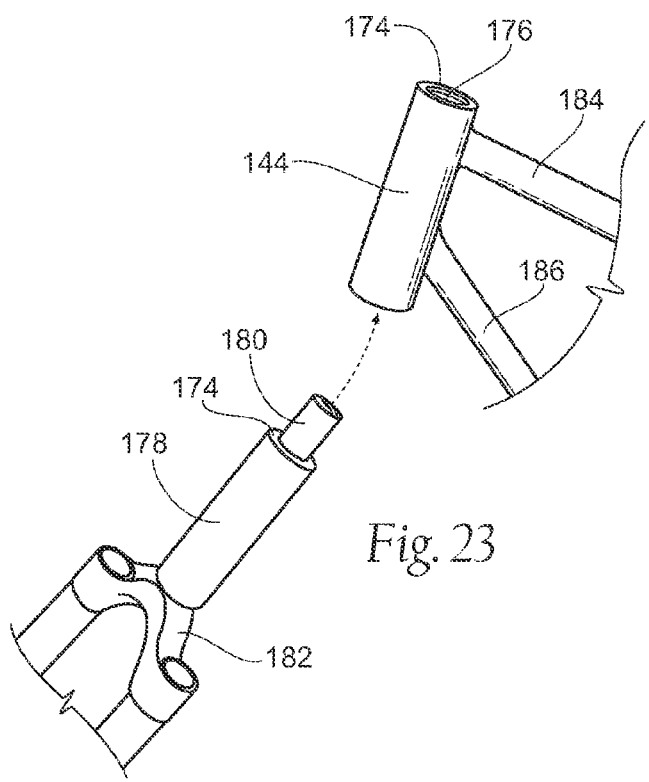
FIGS. 23-25, inclusive, are illustrative of a series of assembly steps leading to the direct coupling of a front frame section and a second 1-piece central frame along with the handle bars of the bicycle depicted in FIG. 1.
Figure 24:
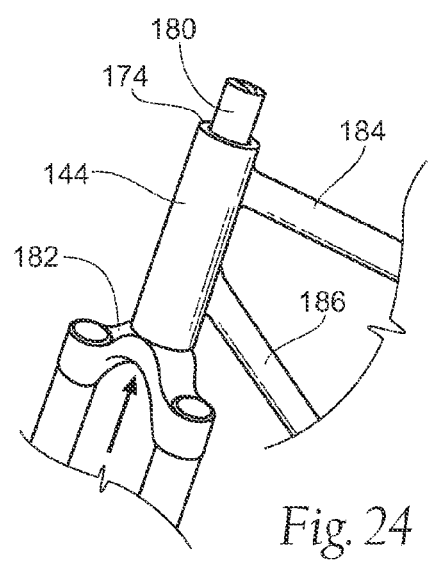
Figure 25:
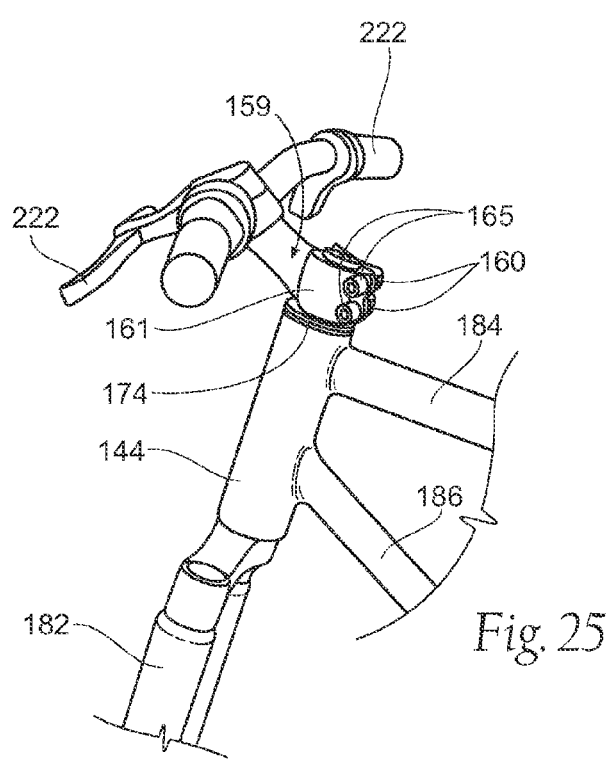

The rotatable head tube 144 is preferably substituted for the several interacting components of clamp 44 which are disclosed and described with reference to FIGS. 7 and 8. With reference to FIGS. 23-25, inclusive, and as mentioned previously, the clamping element of this modified embodiment takes the form of a head tube or sleeve 144. This tubular sleeve 144 is integrally formed as a single structural component of the second section or frame 114. The head tube 144 includes an axial bore 174, and is rotatably and longitudinally slidable with respect to an integrally formed, upstanding post 178 of first section 112. The post 178 is stationary and extends upwardly relative to the fork 182 of the frontal first section 112. The upper end portion of the post 178 includes an integrally formed cylindrical post extension 180 of reduced diameter.

As further depicted in the views of FIGS. 23-25, inclusive, the clamping sleeve, or head tube 144 terminates at its upper end in an integrally formed cover plate 175 having an opening 176 for receiving the post extension 180 of the upstanding post 178 integrally formed at the upper extremity of the fork 182. As depicted in FIG. 23, the head tube 144, integrally formed as a part of frame section 114, is formed with the diameter of the axial bore 174 being of sufficient dimension to slidably and rotatably sit on the post 178. The post extension 180, which is received through the opening 176, is formed to receive the handle bars 22 via the integrally formed, rearwardly extending mounting clamp 159.

Not unlike the earlier described embodiment of FIG. 4, the present modified frame 114 is readily combined with the handlebars 22, and the cable holder 28, which arrangement allows the bicycle to be used normally in all types of terrain and easily collapsible for storage and transportation.

In keeping with the desirable aspects of the present invention, including disassembly into a few sections that are completely separable and means for assembly and disassembly including the application of hand operated (tool less) clamping and locking devices as mentioned earlier herein, the attachment of the handlebar 22 to the frame provides a unique arrangement, which provides for easy interaction and attachment. As specifically set forth in FIG. 25, the handlebars 22 utilize a finger-operated clamp 158, which is integrally formed an open end of the handlebars 22 and is comprised of a generally annular portion 161 having opposed grasping arms 159 which are manually moved to graspingly grip the post extension 180 of the front section 112 as depicted in FIG. 22 by thumb-operated screw-threaded members 165. This arrangement permits quick and facile opening and closing of the respective clamp operating arms 160.

Figure 26:
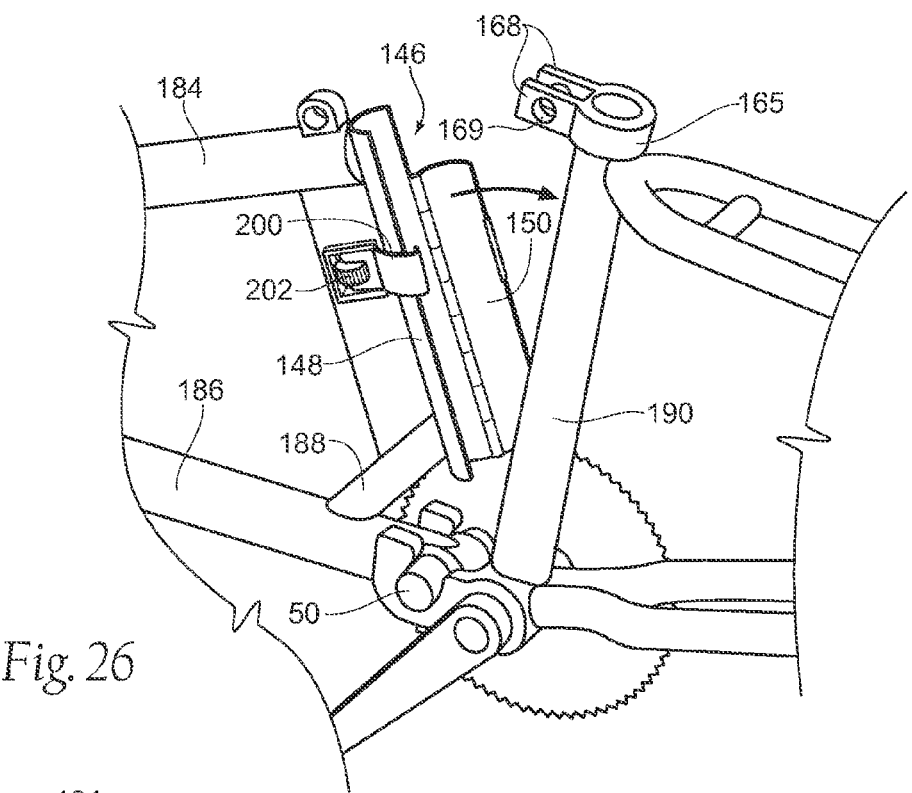
FIGS. 26-28, inclusive, are fragmentary perspective views directed to steps in the assembly of the central stationary frame section to the third section of the bicycle depicted in the view of FIG. 22.
Figure 27:
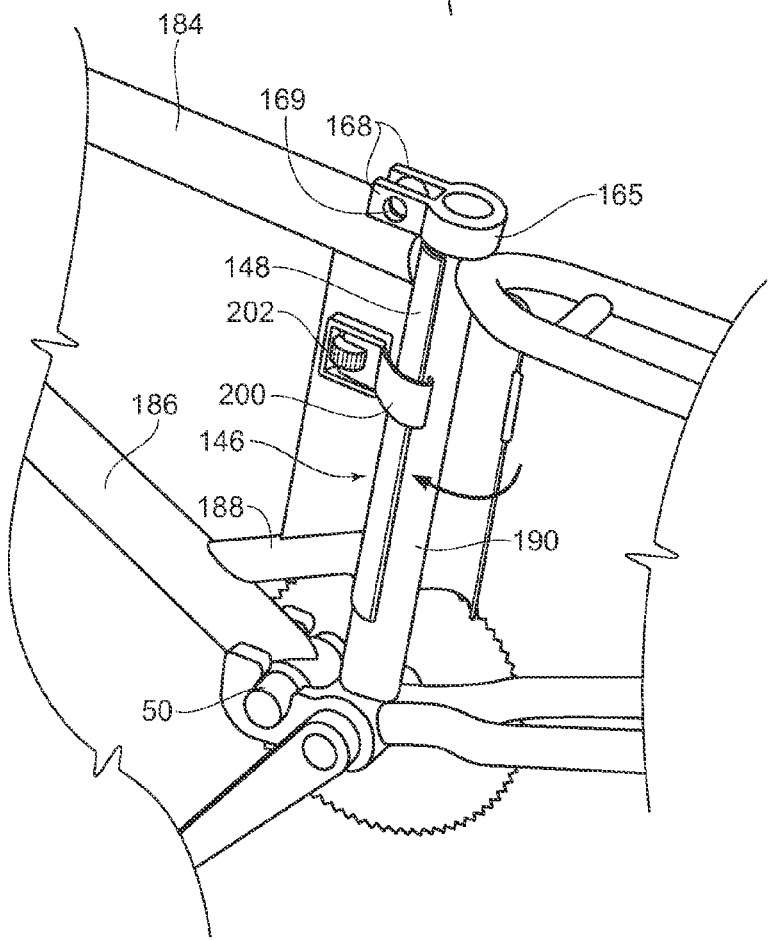
Figure 28:
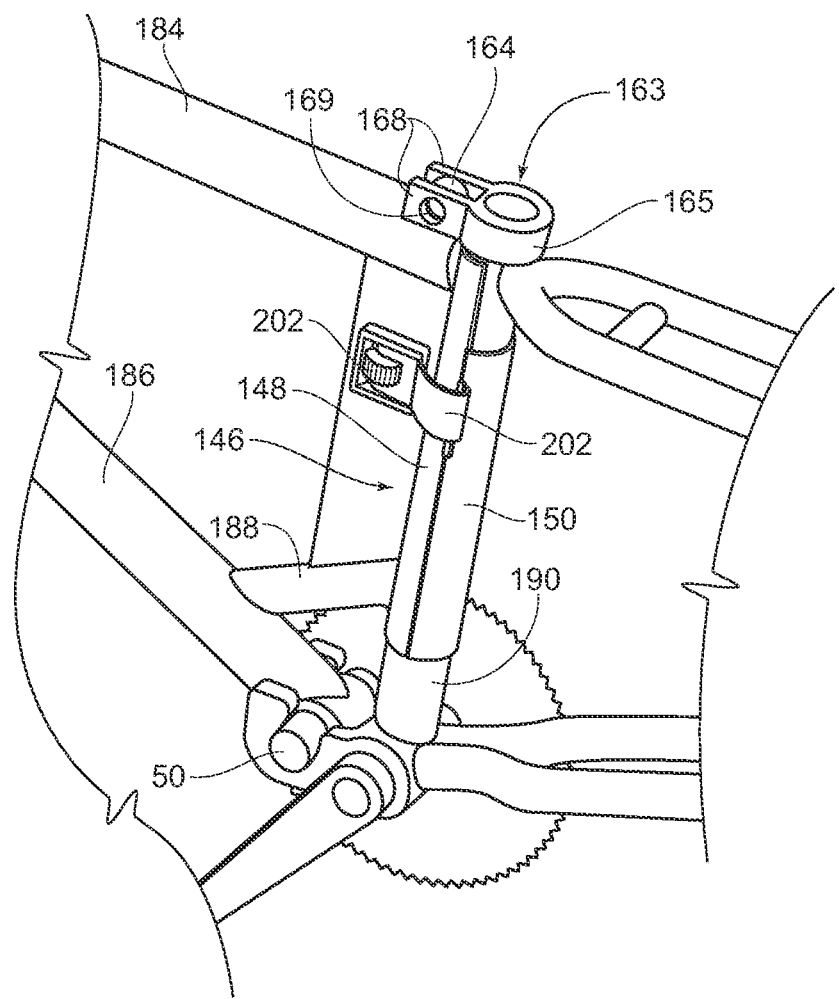

Next with specific reference to views of FIGS. 26-28, the means for attaching the central frame 114 to the third or rear section 116 are specifically illustrated. With regard to FIGS. 26-28, inclusive, and with comparison to the instruction of the clamping elements as viewed with respect to FIGS. 9-12 respectively, the modified embodiment provides a more simplified and readily accessible construction and assembly.

The central frame 114 preferably consists of a one-piece integrated construction. This construction includes a crossbar, conventionally known as a "top tube" 184, a downwardly, rearwardly, extending crossbar or "down tube" 186 welded, or otherwise fastened to a shortened, or upwardly extending, angular crossbar 188. The horizontal crossbar 184 and the angular crossbar 188 each terminate in welding, or otherwise, engagement with a stationary first section 148 of the single clamp 146 (see FIGS. 26-28, inclusive). This stationary section 148 is preferably joined to the open end of the horizontal bar 184 and to the upwardly extending crossbar 188 of the central frame 114. As in the case of the dual clamps 46 and 48 of the embodiment of FIG. 2, the single clamp 146 secures the frame section 114 to the rear section 116. Similarly to the clamp 110, as shown in FIGS. 10-12, inclusive, the alternative concave stationary clamp section 148 has a clasp 200 mounted thereon and arranged for hinged connection with a pivotable locking section 150. The locking clasp 200 also has a thumb-operated release 202 that allows the clamp 111 to be released when necessary for disassembly. The clamp 146 works similarly to the clamps 44 and 46, but comprises a single clamp 146 to allow the frame 114 to be secured to the rear section 116 without interfering with a cable guide 50 and the cables connected thereto. Also, as shown in the views of FIGS. 26-28, inclusive, the clamp 146 substantially surrounds the entire length of the seat tube 190 of the rear frame member 116.

Figure 29:
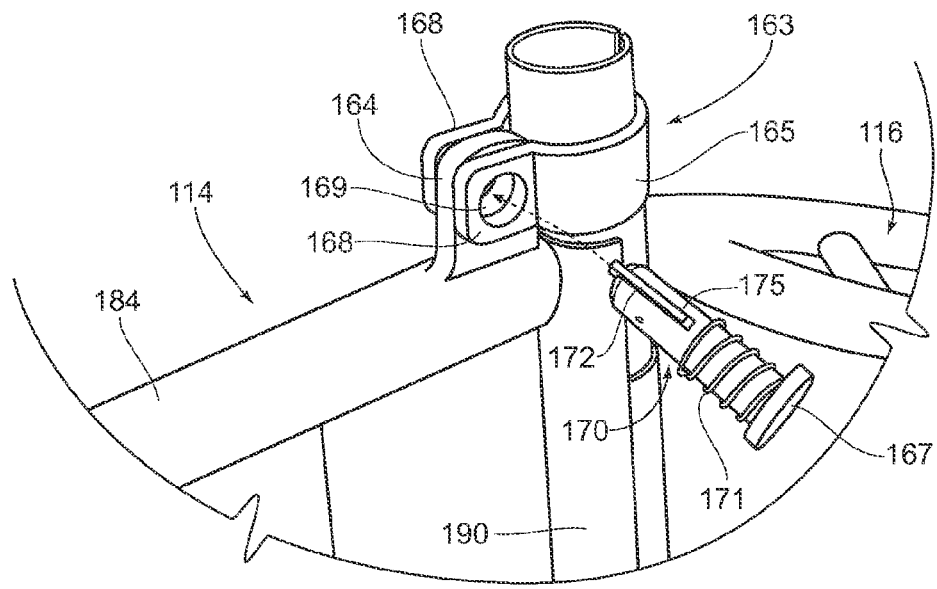
FIGS. 29 and 30 are fragmentary perspective views of the assembly and final locking position of a means of locking together by mere hand insertion and locking operation of a spring-biased "kingpin" mating with an apertured, radially extending, stationary stanchion jointly coupling the central frame section to the third section supporting the rear wheel and chain drive assembly.
Figure 30:
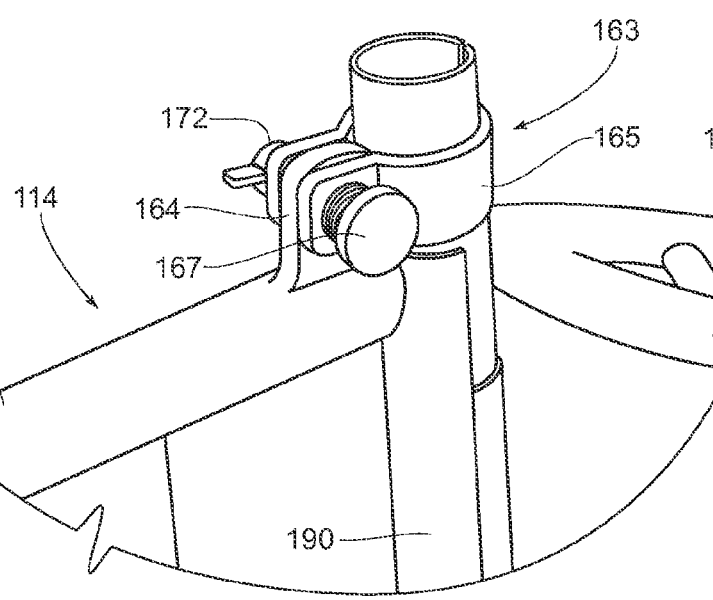

Another feature of the present concept, and as disclosed in FIGS. 22-30, inclusive, resides in the construction of the operating components specifically set forth in the views of FIGS. 28-30, inclusive. It will be observed that this master securing means 163 comprises an upwardly extending stationary stanchion 164 welded, or otherwise fastened to the crossbar, or top tube, 184 proximate to and radially extending from the end thereof, for locking attachment to a compressible clamp 165 having an integrally formed annular portion arranged to embrace the third or rear section tubular downbar or "seat tube" 190. A pair of oppositely disposed and integrally formed mounting ears 168 extend forwardly of the integral, annularly formed, clamp portion 165. Each of the mounting ears 168 is provided with coaxially positioned apertures 169 arranged to receive a retractable securing kingpin 170 extending coaxially through each of the apertures 169. The kingpin 170 includes a circumjacent biasing coil spring 171 which provides a biasing axial withdrawal force. The kingpin 170 is locked in place manually by means of the pivotally positioned, axially aligned locking bar 172 seated in a longitudinal groove 175 and the pinhead 167. The pivotally positioned locking bar 172 may be manually moved from its initial coaxial insertable position in its retention groove 175 to its securing position perpendicular to the axis of said pin 170. The pin 170 is held in securement with the stanchion 164 by means of perpendicular locking bar 172 and the oppositely disposed biasing coil spring 171 biased towards the head 167 of the kingpin 170.

It will be further observed that the embodiments depicted in the views of FIGS. 22-31, inclusive, provide additional means for facile assembly and disassembly, along with more positive securement of the assembled components.

Figure 31:
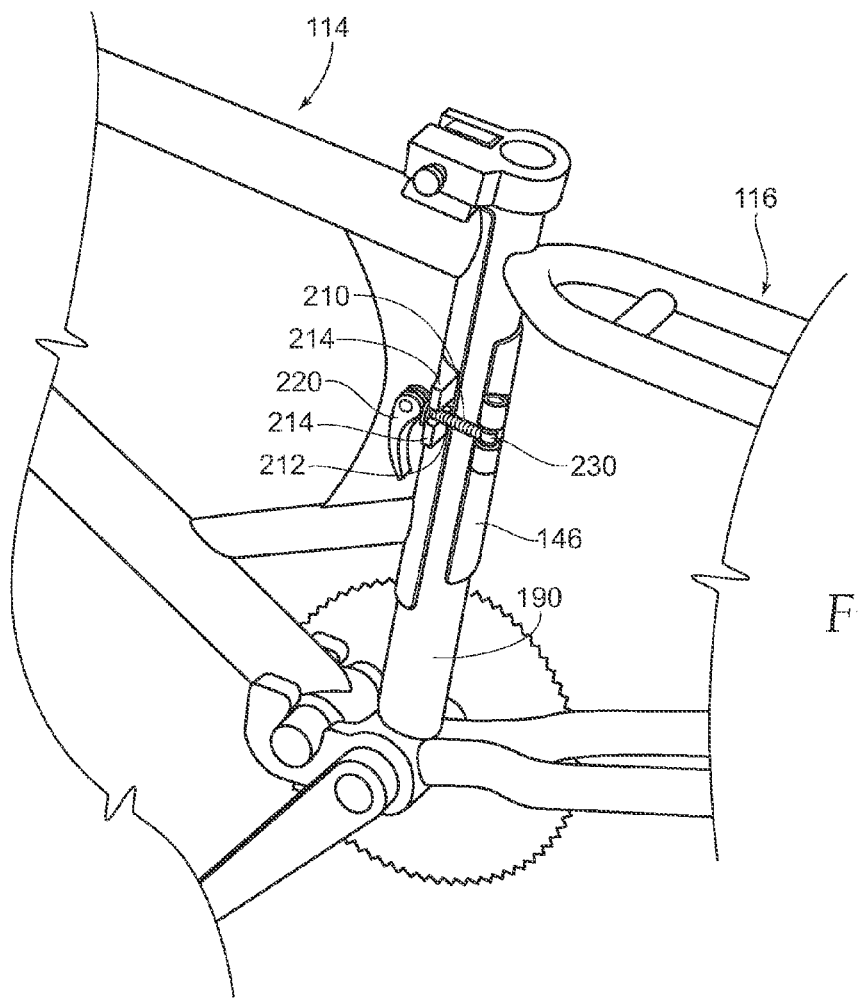
FIG. 31 is a close-up fragmentary perspective view demonstrating an alternate clamp arrangement for the bicycle according to the present invention.
Figure 32:
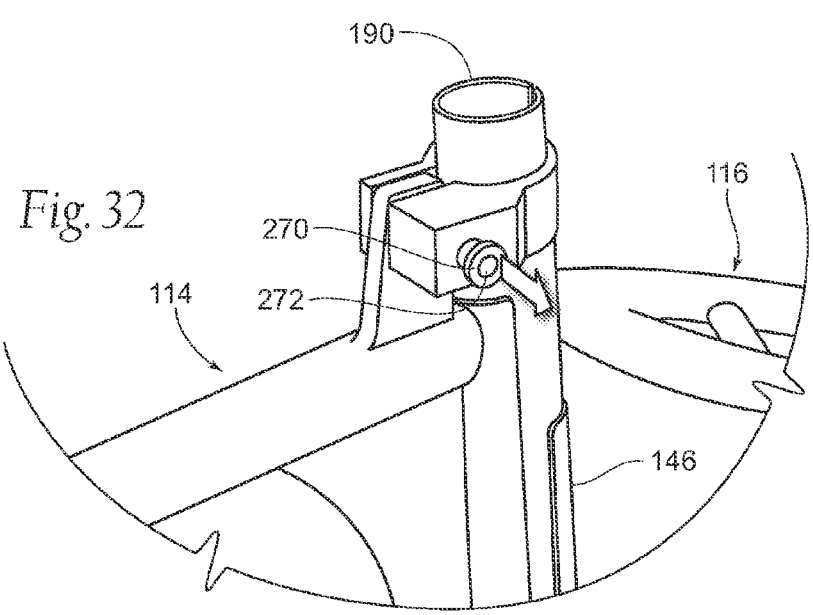
FIG. 32 is a close-up fragmentary perspective view demonstrating an alternate arrangement of the coupling means described in FIGS. 29 and 30.
Figure 33:
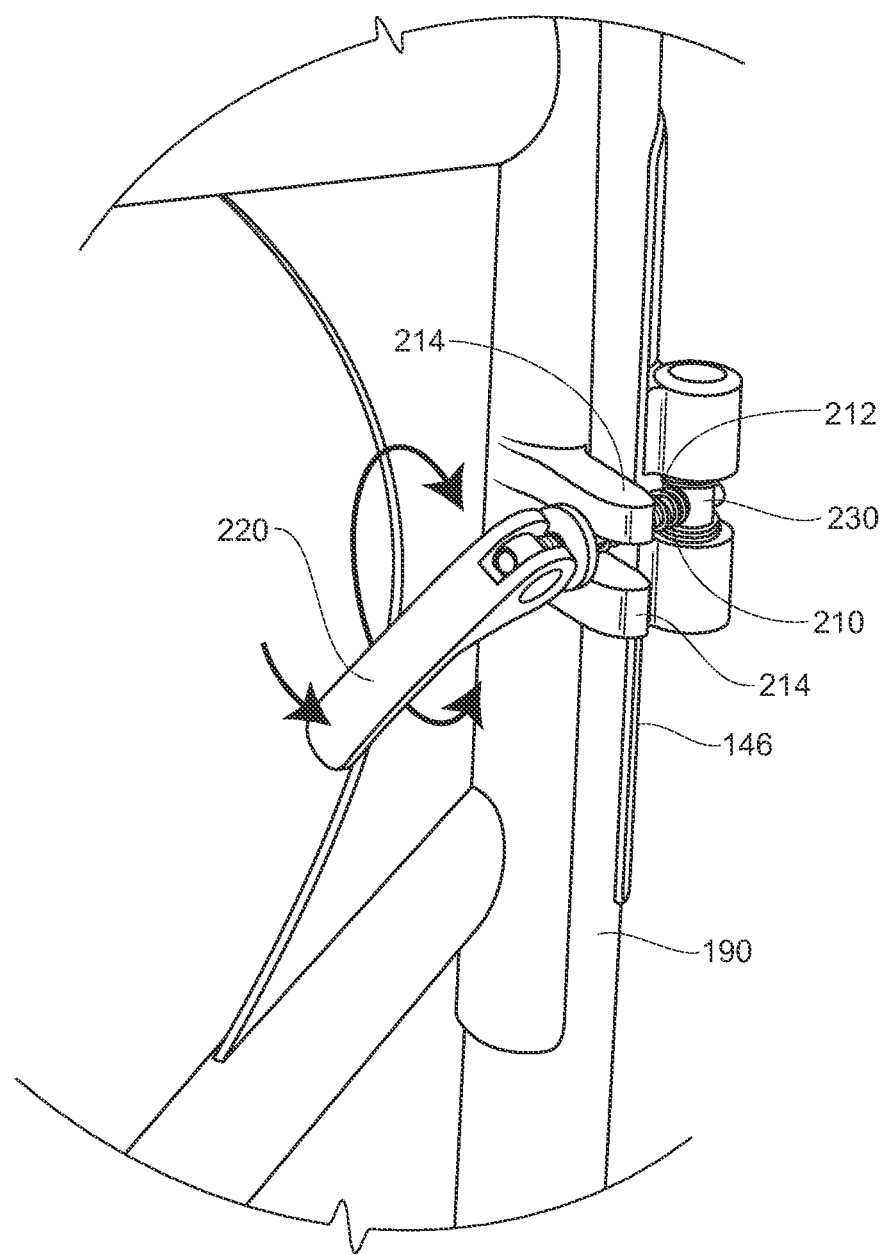
FIG. 33 is a close-up fragmentary perspective view of the device in FIG. 31 in a second position.

FIGS. 31-33 depict further attachment and clamping means that can be incorporated into the present invention. For example, FIGS. 31 and 33 depict the clamp 146 having an alternate arrangement for securing the clamp 146 to the sections 114, 116. A tensioning bar 210 is pivotally connected to the clamp 146 at a fulcrum area 230. The tensioning bar 210 supports a compression spring 212, and is further pivotally connected to a lever 220. The end of the tensioning bar 210 opposing the fulcrum area will fit within the support section 214, with the lever 220 designed to fit on the opposing side of the support section 214 relative to the tensioning bar 210. Similarly to the arrangement of the components previously described and used for clamping the clamps 46, 146, once the tensioning bar 210 is fit within the support section 214, the lever 220 can be rotated and pivoted, as shown in FIG. 33, to firmly secure the sections 114, 116 to one another. As is understood in the art, if it is desired to provide further tension for the clamp 146, the lever 220 can be rotated more than once until the necessary tension is provided to securely couple the sections 114, 116. To uncouple the sections, the lever 220 will be pivoted and rotated in the opposite direction as was used to secure the clamp 146 until the clamp 146 is sufficiently loose around the tube 190 so that the tensioning bar 210 can be removed from between the support section 214.

FIG. 32 also provides an alternate pin 270 to replace the use of the kingpin 170. The alternate pin 270 provides a press release area 272 that will allow the user to easily insert and remove the pin 270 in a secure manner. Alternatively the area 272 could be designed as an area for the used to grasp the pin 270 to insert and remove the pin 270. The pin 270 is designed to secure the tube 190, as previously described using the kingpin 170. As such, it is understood that it would be possible to incorporate any of the described features of the various pins and connecting devices described throughout the application in a further arrangement and still fall within the scope of the present invention.

Thus, the present invention provides an easy to assemble bicycle that is easily transportable. The overall design is designed for efficiency of both assembly time and space. For instance, the pedals can be quickly attached to the bicycle, but also removable and storable when not in use. Likewise, because the sections of the bicycle are completely separate, there is less space used when storing the bike than in prior art folding bicycles. The modular bicycle can be designed for single gear arrangements or multiple gear arrangements and can be quickly assemble without the need for tools. Further, the device is designed so that assembly and disassembly will take place without the need for readjusting the tension or slack for the gears and the brakes of the device. The storage bag or container will also be preferably designed to minimize the necessary storage area for the bicycle.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

I claim:
1. A modular bicycle comprising:
    a separate frontal first section, said frontal first section comprising an upstanding cylindrical post and a first tire;
    a separate intermediate second section being directly coupleable with said first section and comprising a one-piece central frame including a through bore being slidably receivable and rotatably en ageable with said first section upstanding post;
    a separate third section being coupleable to said second section and comprising a rear frame section a second tire and a handlebar; and
    master locking means for securing said intermediate section to said rear section wherein said master locking means further comprises:
    an upstanding apertured stanchion member affixed to said intermediate frame;
    a pair of oppositely disposed mounting ears, each of which mounting ears includes a coaxial aperture and further being arranged to be coaxial with the aperture of said stanchion;
    and a kingpin adapted for insertion and removal in said coaxial apertures.
2. The bicycle of claim 1 where said kingpin further comprises a circumjacent biasing coil spring positioned between the head of said kingpin and said stationary stanchion, and a finger-operated pivotally positioned, axially aligned locking bar seated in a longitudinal groove formed in the surface of said kingpin.

3. The bicycle of claim 1 further comprising a rear brake for said second tire, said rear brake comprising:

a brake pad mechanism located on said third section;

a brake lever located on said handle bar; and a brake cable extending from said brake lever to said brake pads.

4. The bicycle of claim 1 further comprising a locking mechanism for maintaining a specific tension for said rear brake when said bicycle is in a disassembled or assemble state.

* * * * *

UNITED STATES PATENT AND TRADEMARK OFFICE
CERTIFICATE OF CORRECTION

PATENT NO. : 8,556,284 B2  
APPLICATION NO. : 13/016635  
DATED : October 15, 2013  
INVENTOR(S) : Harry Appleman Page 1 of 1

It is certified that error appears in the above-identified patent and that said Letters Patent is hereby corrected as shown below:

Title Page:

Item (74) Attorney, Agent, or Firm–delete "Ryan Krumholz & Manion, S.C." and substitute --Ryan Kromholz & Manion, S.C.--

In the Claims:

Column 10, line 49 of claim 1, after "and rotatably" delete "en ageable" and substitute --engageable--

Signed and Sealed this  
Seventeenth Day of December, 2013

Margaret A. Focarino  
*Commissioner for Patents of the United States Patent and Trademark Office*